Patented Sept. 13, 1938

2,129,936

UNITED STATES PATENT OFFICE 2,129,936

METHOD FOR PREPARING FRESH FRUIT FOR MARKET

Joe E. Johnson, Venice, Calif., assignor to Food Machinery Corporation, San Jose, Calif., a corporation of Delaware No Drawing. Application September 15, 1934, Serial No. 744,172

4 Claims. (Cl. 99—156)

This invention has to do in a general way with the art of preparing fresh fruit, vegetables and the like for market, and is more particularly concerned with the treatment of perishable materials of this character for the purpose of killing and removing bacteria and fungi, such as mold spores, scale and the like to prevent or inhibit putrefaction and thereby prolong the marketable life of the material.

I am aware of the fact that certain inorganic chemicals, such as borax and boric acid have been used to arrest the development of blue mold in citrus fruits and the like, but I have discovered that while these inorganic chemicals may prove effective to kill spores which may be present in the rind of the fruit at the time of treatment and thereby prevent the development of mold and consequent putrefaction resulting from the spores present at the time of treatment, they are not effective to prevent infection and consequent development of mold and putrefaction after treatment. Efforts have been made to prevent such infection by using the borax treatment in connection with a wax treatment, the primary purpose of which is to prevent shrinkage of the fruit, but since it has been proven that substantially 20% of the surface of the fruit must be left exposed or unwaxed to permit "breathing," it will be seen that this cannot be entirely relied upon to prevent infection after treatment.

It therefore becomes a primary object of this invention to provide a treatment for perishable fruit and vegetables, which leaves in the rind or skin of the treated fruit a non toxic compound which will prevent infection of the fruit over an indefinite period of time after treatment.

In this connection I have discovered that orthophenylphenol (o—$C_6H_5 \cdot C_6H_4OH$) or the orthophenylphenol radical has the property of penetrating the skin or rind of the fruit and being retained there over indefinite periods of time. This compound and its various derivatives carrying the phenylphenol radical are non toxic to humans but are highly effective in killing and preventing the growth of the various microorganisms which prey upon fruit and vegetables and bring about their early putrefaction.

It is an important object of this invention to produce a process of the class described in which the antiseptic material is carried in a solution of a soap or a detergent so that it is cleansed and immunized against infection in one and the same operation.

Since orthophenylphenol is insoluble in water, the preferred method of my invention contemplates the use of a water soluble orthophenylphenate, such as the alkali phenylphenates and I consider it advisable that the concentration of the phenylphenol radical in the treating solution be not greater than 1%. Concentrations of 0.1% to 0.3% are preferable.

As an exemplary procedure contemplated by this invention I employ a 1% to 3% soap solution (a vegetable oil or a tallow soap being preferred) which contains 0.1% sodium orthophenylphenate (o—$C_6H_4 \cdot C_6H_4ONa \cdot nH_2O$). The solution is heated to a temperature of substantially 100° F. and the fruit is soaked or washed therein for from two to five minutes after which it is removed and dried. If desired the fruit may be subjected to a suitable waxing process to prevent shrinkage, but this is unnecessary so far as the immunization of the fruit from fungi and bacteria is concerned. The temperature of the treating solution may be varied within comparatively wide limits. I have found that best results are obtained with temperatures in excess of 60° F. and of course the temperature must not be high enough to scald the fruit. Roughly, temperature limits of from 60° F. to 120° F., have been found to be most satisfactory. Also this solution is not confined to sodium orthophenylphenate but may be made with various other water soluble derivatives of phenylphenol such as the alkali derivatives (potassium, calcium, ammonium, etc.).

Another effective solution which may be used in the process contemplated by this invention is made by dissolving 1 part of water soluble phenylphenate, such as sodium orthophenylphenate, 1 part sodium silicate, 1 part ethylene-glycol-monobutylether, and 1 part cactus extract in six parts of water to make a concentrate. This concentrate is diluted with water to a concentration of 1% of concentrate (0.1% phenylphenate) and used in the same treatment outlined above.

Orthophenylphenol, which as pointed out above is insoluble in water, and the insoluble derivatives thereof such as chlorthophenylphenol (o—$C_6H_5 \cdot C_6H_3ClOH$) may be effectively used in the method contemplated by this invention by dissolving same in a suitable organic solvent, such as benzene, and forming an emulsion with this organic solution and an aqueous soap solution. Like the other treating solutions the concentration of phenylphenol in this emulsion should not exceed 1% and is preferably from 0.1% to 0.3%.

While the method and composition contemplated by this invention may be used in connection with all fruits, vegetables and the like, it is particularly advantageous for use in connection with citrus fruits, since unlike the compounds now in use which are only partially effective on but one or two of the infections of such fruits, the composition contemplated by the invention has been found by actual test, to destroy and prevent infection with blue mold, green mold, black mold, brown rot and stem rot. It also has the advantage of killing the various insects carried by the fruit as it is taken from the orchard. For example black scale, red scale, purple scale, brown scale and San Jose scale have all been found to be killed by the phenylphenol radical present in the solutions contemplated by this invention.

It is to be understood that while I have described certain preferred concentrations and temperature conditions for the method or treatment contemplated by this invention, and have recited certain preferred derivatives of orthophenylphenol as being particularly advantageous in practising the invention, the invention is not confined to the specific example given herein, but includes within its scope such changes, or modifications as may fairly come within the spirit of the appended claims.

I claim as my invention:

1. The method of preparing fresh fruit and the like for market which includes contacting said fruit with a solution containing the following ingredients in substantially the following proportions:

|  | Parts |
|---|---|
| Water soluble alkali salt of orthophenylphenol | 1 |
| Sodium silicate | 1 |
| Ethylene-glycol-monobutylether | 1 |
| Cactus extract | 1 |
| H₂O | 996 |

2. In a method of treating whole citrus fruit to inhibit decay thereof, the steps of contacting whole citrus fruit with an aqueous detergent solution containing sodium silicate and from about 0.1% to 0.3% of a water-soluble alkali salt of orthophenylphenol.

3. In a method of treating whole citrus fruit to inhibit decay thereof, the steps of contacting whole citrus fruit with an aqueous treating agent containing sodium silicate and from about 0.1% to 0.3% of a water-soluble alkali salt of orthophenylphenol.

4. In a method of treating whole fruit to inhibit decay thereof, the steps of contacting whole fruit with an aqueous treating agent containing sodium silicate and from about 0.1% to 1.0% of a water-soluble alkali salt of orthophenylphenol.

JOE E. JOHNSON.